US007518960B2

(12) United States Patent
Serrano et al.

(10) Patent No.: US 7,518,960 B2
(45) Date of Patent: Apr. 14, 2009

(54) METHOD AND APPARATUS FOR POSITIONING BEAM SPOT ON RECORDING MEDIUM

(75) Inventors: Louis J. Serrano, Los Gatos, CA (US); Xiao Lin, San Jose, CA (US)

(73) Assignee: LSI Corporation, Milpitas, CA (US)

( * ) Notice: Subject to any disclaimer, the term of this patent is extended or adjusted under 35 U.S.C. 154(b) by 491 days.

(21) Appl. No.: 11/312,214

(22) Filed: Dec. 13, 2005

(65) Prior Publication Data

US 2007/0133364 A1    Jun. 14, 2007

(51) Int. Cl.
*G11B 7/00* (2006.01)
*G11B 5/596* (2006.01)

(52) U.S. Cl. .............. 369/44.29; 369/53.14; 360/77.02; 360/77.04

(58) Field of Classification Search .............. 369/44.28, 369/44.29, 44.35, 53.14; 360/77.01, 77.02, 360/77.04, 77.06, 77.07
See application file for complete search history.

(56) References Cited

U.S. PATENT DOCUMENTS

| 5,285,431 | A * | 2/1994 | Ogawa ................... 369/30.15 |
| 5,307,333 | A * | 4/1994 | Ikeda et al. .............. 369/44.28 |
| 6,473,373 | B1 * | 10/2002 | Soma et al. .............. 369/44.29 |
| 6,504,668 | B1 * | 1/2003 | Takeuchi et al. ......... 360/77.04 |
| 6,504,799 | B1 * | 1/2003 | Yamashita et al. ....... 369/44.11 |
| 6,549,492 | B1 * | 4/2003 | Song ....................... 369/44.29 |
| 6,661,751 | B2 * | 12/2003 | Asakura ................... 369/44.27 |
| 6,775,091 | B1 * | 8/2004 | Sutardja .................. 360/77.04 |
| 6,831,803 | B2 * | 12/2004 | Hsin ....................... 360/77.04 |
| 7,145,745 | B1 * | 12/2006 | Shepherd et al. ......... 360/77.04 |
| 7,355,931 | B2 * | 4/2008 | Yoshimoto ............... 369/44.29 |
| 2006/0221789 | A1 * | 10/2006 | Yoshimoto ............... 369/47.45 |
| 2007/0091741 | A1 * | 4/2007 | Serrano et al. ........... 369/44.29 |

OTHER PUBLICATIONS

"Comparative Studies on Repeatable Runout Compensation Using Iteractive Learning Control", pp. 1-2, http://www.eng.nusedu.sg/EResnews/1001/rd/re₁₃ 7.html, Oct. 2001.
Daniel Abramovitch et al., "Decomposition of Baseline Noise Sources in Hard Disk Position Error Signals Using the PES Pareto Method", In the Proceedings of the 1997 American Controls Conference in Albuquerque, NM, Jun. 3-6, 1997, pp. 1-5.

* cited by examiner

*Primary Examiner*—Thang V Tran
(74) *Attorney, Agent, or Firm*—Christopher P. Maiorana, PC

(57) ABSTRACT

A method and apparatus position a beam spot on a recording medium. The positioning includes (a) observing a first center error in a first closed loop control during tracking mode, the first center error including a repeatable run out (RRO) error, (b) estimating a center error (CE)-RRO from the first center error, the CE-RRO being part of the first center error caused by the RRO, (c) observing a second center error in a second closed loop control during a rough seek, (d) subtracting the CE-RRO from the second center error, (e) controlling the beam spot based on the second center error less the CE-RRO during the rough seek, and (f) adding an open loop control to the second closed loop control during the rough seek, the added open loop control inducing a motion of the lens relative to an optical center of the OPU during the rough seek.

20 Claims, 16 Drawing Sheets

CLOSED LOOP TRACKING SERVO SYSTEM

ROUGH SEEK OPERATION

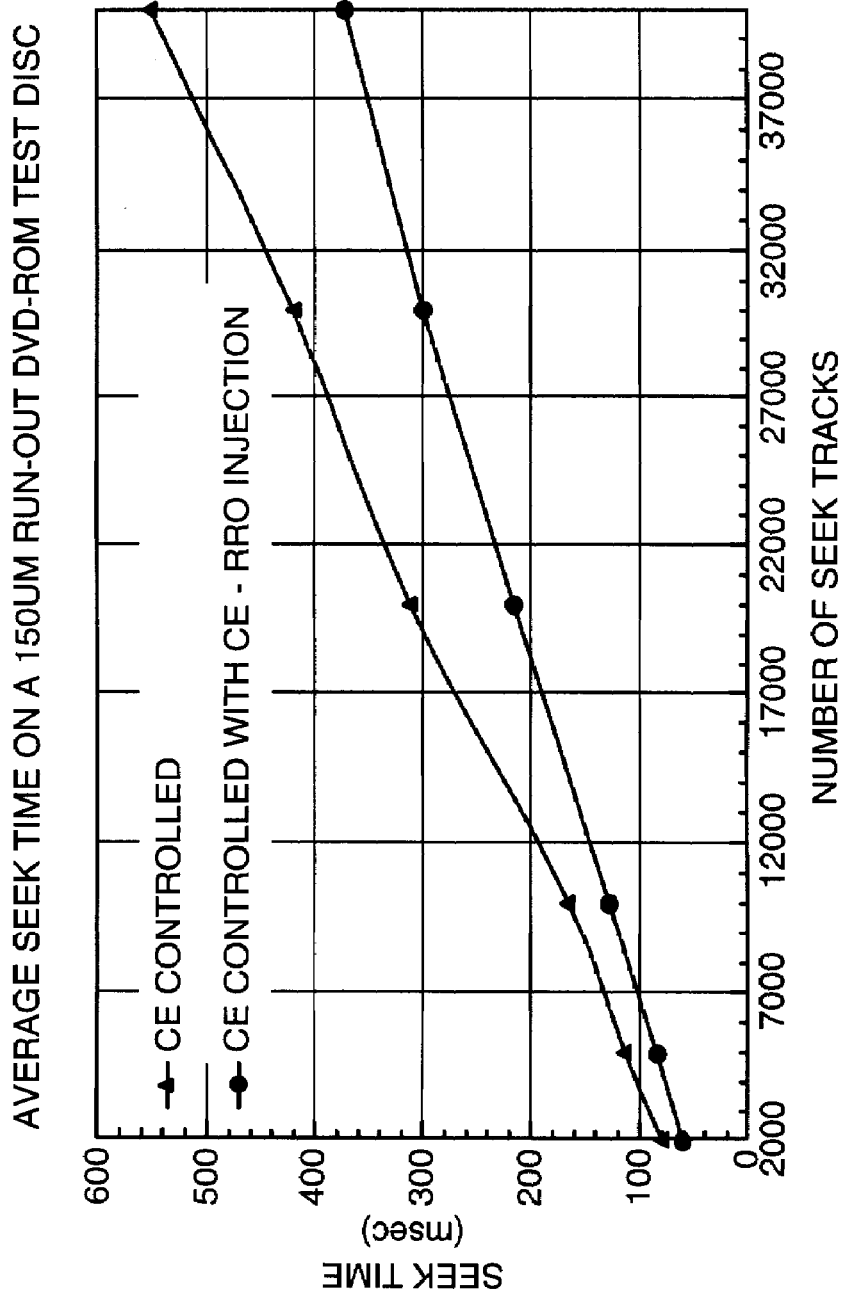

METHOD AND APPARATUS FOR POSITIONING BEAM SPOT ON RECORDING MEDIUM

CROSS REFERENCE TO RELATED APPLICATIONS OR PRIORITY CLAIM

This application is related to U.S. patent application Ser. No. 10/928,493, entitled "Method and Apparatus for Canceling Repeatable Run out Errors in Positioning on Recording Medium", filed on Aug. 27, 2004 in the name of Louis J. Serrano, one of the inventors, and commonly assigned wherewith.

FIELD OF THE INVENTION

The present invention relates to disc drivers and disc drive control systems. More particularly, the present invention relates to a method and apparatus for positioning a beam spot on a recording medium in a disc driver.

BACKGROUND OF THE INVENTION

The tracks on an optical recording medium such as a compact disc (CD) or digital versatile disc (DVD), form a long spiral. In order to read and/or write data from/to the recording medium, a disc driver must position its optical head or optical pickup unit (OPU) onto a designated data point (the corresponding track) and a laser beam spot must follow the track on the rotating disc. An OPU includes a light source (for example, laser diode), an optical system, including an objective lens, to focus the laser beam onto the optical disc, and a photo-detector array to detect the reflected/diffracted light from the disc.

The laser beam from the OPU includes a primary beam and two secondary side beams provided on both sides of the primary beam. The primary beam is to be centered on a track (pit area) and detected by a main photo-detector (quadrant detector). The secondary beams are to be centered on the "land" formed both sides of the track, and detected by two additional (side) photo-detectors place alongside of the main detector. If the primary beam is right on the center of the track, the two sides of the main photo-detector and the side photo-detectors would (ideally) receive equal amount of light from the secondary beams. As the optical head drift to either side of the track, the amount of light reflected from the tracking beams varies. Diffraction would cause a change in the light intensity on the two different sides of the photo detector array. The difference signal (push-pull signal) is proportional to the amount of deviation of the beam from the center of the track.

The movement of the OPU is controlled by actuators. A typical servo control of a disc driver includes focus servo control and tracking servo control. The tracking servo could be in rough (coarse) seek, fine seek, or tracking mode. The rough seek is performed by a sled actuator or "sled" which leads the optical head to the vicinity of destination along the surface of the disc radially, and thus this operation is also referred to as "sled seek." The terms "sled seek" and "rough seek" are used interchangeably in this specification. The fine seek is performed by a fine actuator located inside the optical head, which drives the lens within the housing of the optical head so as to precisely and rapidly position the laser beam on to the desired track while keeping the tracking servo loop closed. The fine seek is typically performed within 1,000 tracks.

As the disc rotates, the laser beam follows the spiral of the track from the inner diameter (ID) to the outer diameter (OD). However, if the disc has run out due to manufacturing tolerance or otherwise, the center of the spiral may not be the center of rotation of the spiral. Thus, as the disc rotates, the track moves radially with respect to a fixed point, for example, the laser beam spot. This radial motion is referred to as "run out." The repeatable run out (RRO) error is a repeatable, predicable off-track motion caused by a mis-centering of a disc on the spindle motor, i.e., a physical misalignment between the center of the disc and the center of the rotation. Typically, the RRO is less than 150 µm for DVDs, and less than 280 µm for CDs.

FIGS. 1A through 1D schematically illustrates the run out seen at the rotational angles 0, $\pi/2$, $\pi$, and $3\pi/2$, respectively. In FIGS. 1A through 1D, the solid line 10 represents the track position with run out, and the broken line 12 represents the track position without run out. In order to reduce the effect of this run out error and other errors in laser beam positioning (or "tracking"), a closed loop control system is used. While the closed loop control is operating, the lens will move radially along with the disc so that the laser beam spot is held on the center of the track.

The "track position" is defined as location of the laser beam spot with respect to the track center, which is detected by imaging the beam spot onto a photo-detector array, as mentioned above. Diffraction causes a slight change in intensity of the light received on the two sides photo-detectors. This difference in the intensity, i.e., the push-pull signal, is proportional to the track error (TE).

However, if the laser beam from the light source does not travel directly through the center of the optical lens, i.e., the laser beam is off-centered, reflection and refraction of the light would shift the image of the beam spot to one side of the photo-detector array. This image-shifting effect due to the off-centered laser position on the lens is referred to as the "center error" or "CE". The center error is also observed as the difference in the light intensity received by the two sides of the photo-detectors, and the push-pull effect of the center error and that of the track error are not distinguishable by examining one track position alone. Thus, in order to obtain an accurate track error, a second measurement is taken one-half track away. The effect of the center error is the same in the first and second measurements, but the push-pull effect of the track error is reversed in the first and second measurements. By combining these two measurements an accurate track position (track error) can be determined. For example, the push-pull signals of the first measurement (main push-pull: MPP) and the second measurement (side push-pull: SPP) are expressed as follows:

$$MPP = TE + CE$$

$$SPP = \frac{1}{k}(-TE + CE)$$

Where k is a factor added because the second measurement receives less light. Thus, the net track error TE is obtained as:

$$TE = MPP - k \times SPP$$

As discussed above, in order to position the laser beam spot onto the center of the track on the rotating disc, the lens moves radially once per revolution, following the radial disc movement due to the run out. That is, when the laser beam is locked to the disc, the lens radially moves with respect to the optical center of the OPU. Here, the optical center is the center of the housing of the OPU, along which the center of the laser beam is aligned. This lens motion induces a center error that is synchronous to the disc rotation.

When it is desired to move the laser beam spot from a track to another track, either the lens by itself can be moved within the housing of the OPU (fine seeking), or the OPU including the lens can be moved by the sled actuator (rough or sled seeking). The fine seeking is fast because the laser beam spot stays locked to the disc, even while track crossing. However, if the target track is far away, the lens cannot move far enough within the OPU. Thus, the sled is used to reposition the OPU to the vicinity of the target track. During the sled seek, the laser beam spot is unlocked from the disc, and the center error is used to control the laser beam spot to stay at the center of the housing of the OPU. This is done in order to prevent the lens from inadvertently hitting the housing when the sled accelerates or decelerates the OPU, since such an impact can cause the lens to lose focus.

When the laser beam spot is locked to the track, a closed loop control system of the disc driver eliminates the effect of run out. However, during a rough seek (or sled seek), as described above, the laser beam spot is unlocked from the track. Thus, upon completion of the rough seek, the laser beam spot must be locked to the disc again. However, if the run out is large, the relative motion between the laser beam spot and the disc may also be large, making it difficult to lock the laser beam spot to the disc.

BRIEF DESCRIPTION OF THE INVENTION

A method and apparatus position a beam spot on a recording medium. The positioning includes (a) observing a first center error in a first closed loop control during tracking mode, the first center error including a repeatable run out (RRO) error, (b) estimating a center error-RRO from the first center error, the center error-RRO being part of the first center error caused by the RRO, (c) observing a second center error in a second closed loop control during a rough seek, (d) subtracting the center error-RRO from the second center error, (e) controlling the beam spot based on the second center error less the center error-RRO during the rough seek, and (f) adding an open loop control to the second closed loop control during the rough seek, the added open loop control inducing a motion of the lens relative to an optical center of the OPU during the rough seek.

BRIEF DESCRIPTION OF THE DRAWINGS

The accompanying drawings, which are incorporated into and constitute a part of this specification, illustrate one or more embodiments of the present invention and, together with the detailed description, serve to explain the principles and implementations of the invention.

In the drawings:

FIG. 16 is a diagram schematically illustrating an effect of adding an open loop control based on the CE-RRO in the lens control during sled motion of a rough seek in accordance with one embodiment of the present invention.

DETAILED DESCRIPTION

Figure 1A:
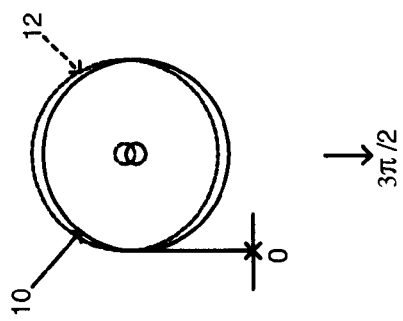
FIGS. 1A through 1D are diagrams schematically illustrating the run out seen at the rotational angles 0, π/2, π, and 3π/2, respectively.
Figure 1B:
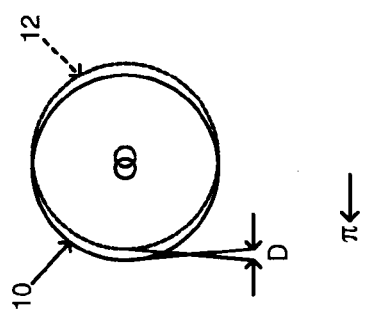
Figure 1C:
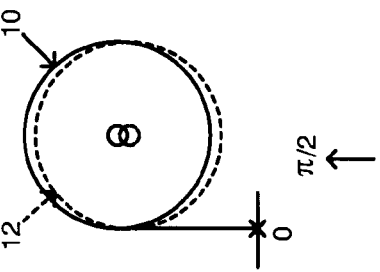
Figure 1D:
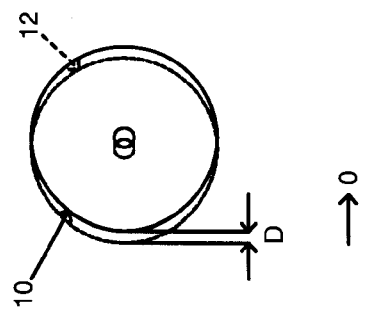

Embodiments of the present invention are described herein in the context of a method and an apparatus for positioning a beam spot on a recording medium. Those of ordinary skill in the art will realize that the following detailed description of the present invention is illustrative only and is not intended to be in any way limiting. Other embodiments of the present invention will readily suggest themselves to such skilled persons having the benefit of this disclosure. Reference will now be made in detail to implementations of the present invention as illustrated in the accompanying drawings. The same reference indicators will be used throughout the drawings and the following detailed description to refer to the same or like parts.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

In accordance with one embodiment of the present invention, the components, process steps, and/or data structures may be implemented using various types of operating systems (OS), computing platforms, firmware, computer programs, computer languages, and/or general-purpose machines. The method can be implemented as a programmed process running on processing circuitry. The processing circuitry can take the form of numerous combinations of processors and operating systems, or a stand-alone device. The process can be implemented as instructions executed by such hardware, hardware alone, or any combination thereof. The software may be stored on a program storage device readable by a machine.

In addition, those of ordinary skill in the art will recognize that devices of a less general purpose nature, such as hardwired devices, field programmable logic devices (FPLDs), including field programmable gate arrays (FPGAs) and complex programmable logic devices (CPLDs), application specific integrated circuits (ASICs), or the like, may also be used without departing from the scope and spirit of the inventive concepts disclosed herein.

In accordance with one embodiment of the present invention, the method may be implemented on a data processing computer such as a personal computer, workstation computer, mainframe computer, or high performance server running an OS such as Solaris® available from Sun Microsystems, Inc. of Palo Alto, Calif., Microsoft® Windows® XP and Windows® 2000, available form Microsoft Corporation of Redmond, Wash., or various versions of the Unix operating system such as Linux available from a number of vendors.

Figure 2:
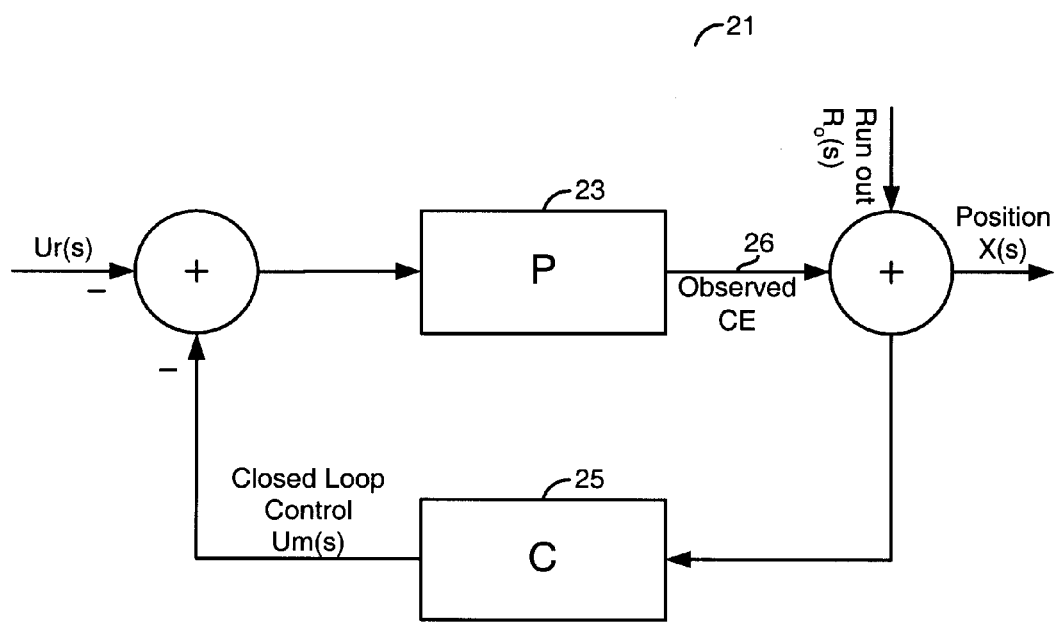
FIG. 2 is a block diagram schematically illustrating a closed loop optical drive system suitable to implement aspects of the present invention, which is in tracking mode.

FIG. 2 schematically illustrates a closed loop optical drive system 21 suitable to implement aspects of the present invention. For example, the optical drive system 21 may be a compact disc (CD) player or digital versatile disc (DVD) player. The closed-loop optical drive system 21 can be divided into two parts: a controller 25 and a plant 23. The plant 23 encompasses physical mechanisms such as drivers, sensors, motors, read-write heads or OPU, and the like. The controller 25 is typically implemented as a computer program on a digital signal processor (DSP). The software may be stored on a program storage device readable by a machine. The controller 25 typically provides a head-positioning servomechanism which aims at positioning the read-write head (or OPU) over the desired track on the optical disc with minimum error.

When the laser beam spot is locked to the disc, i.e., the optical drive system 21 operates as a closed loop tracking servo system, the transfer function of the plant 23 is designated P(s), while the transfer function of the controller 25 is designated C(s), which are interconnected as shown in FIG. 2. FIG. 2 also illustrates the locations in the loop where the run out error $R_o(s)$ enters, where the tracking error (position) X(s) is measured, where the run out cancellation control $u_r(s)$ is applied, assuming an open loop cancellation method is used, and where the control $u_m(s)$ out of the controller 25 is measured. In FIG. 2, measurement noise is ignored for simplicity. It should be noted that these variables are expressed in the frequency domain using the s parameter. When these variables are used to measure a response or calculate a control, they are considered to be true only in the range of frequencies of interest, and only on average. For example, a statement that "the cancellation control is set equal to the measured control" means that the statement is true at the run out frequency range and only in an average sense.

Figure 3:
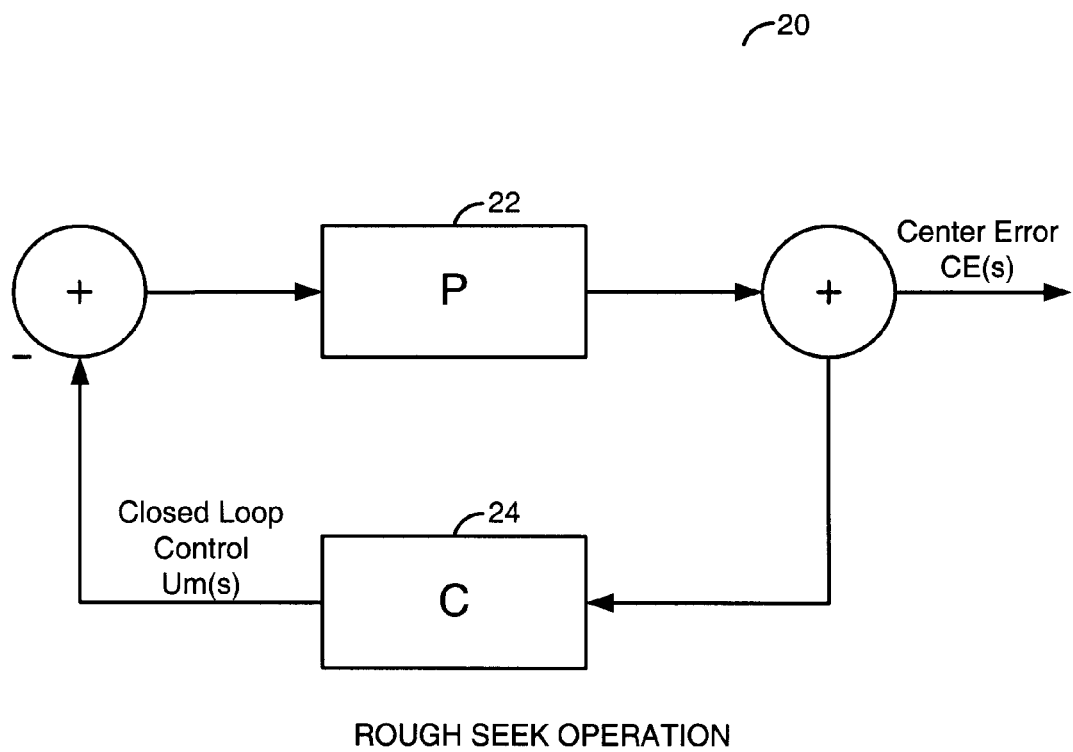
FIG. 3 is a block diagram schematically illustrating an optical drive system performing a conventional rough seek operation where the laser beam spot is not locked to the track.

FIG. 3 schematically illustrates a conventional optical drive system 20 performing a conventional rough seek operation when the laser beam spot is not locked to the track. That is, the optical drive system 20 operates as a closed loop centering servo system. The transfer functions are defined in a similar manner as those in the above-mentioned tracking servo operation of the optical drive system 21. However, in the conventional centering servo operation, instead of measuring the relative position of the laser beam spot with respect to the track center, the position of the lens relative to the optical center of the OPU housing is used. Conventionally, the run out is not observed, and instead the center error provides the position feedback. In the conventional control of the optical drive system 20, as shown in FIG. 3, no open loop run out cancellation control is entered, either.

Figure 4:
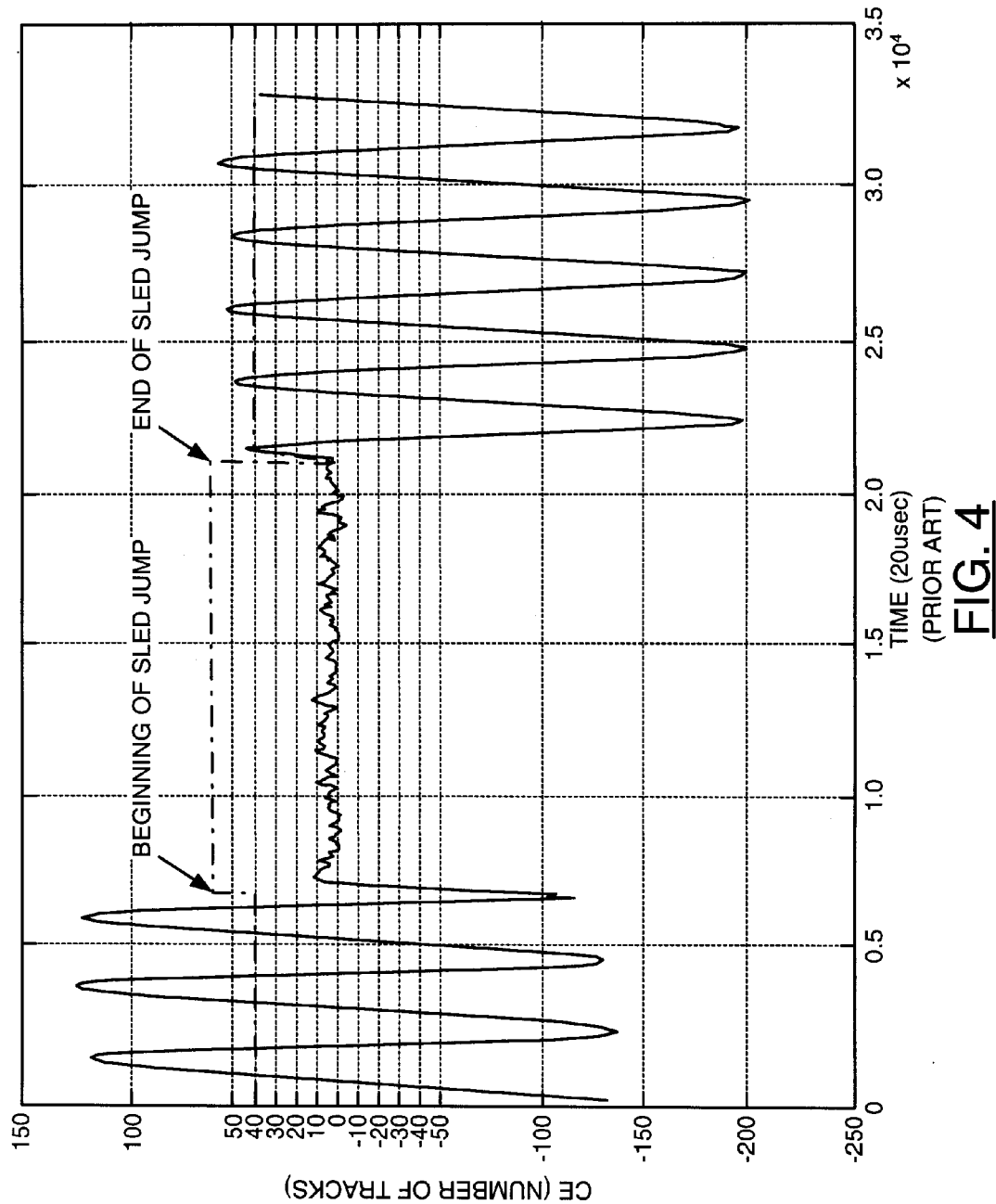
FIG. 4 is a diagram schematically illustrating a plot of the center error (CE) when the lens is controlled by the tracking servo under tracking mode (the laser beam is locked to the track), and when the lens is controlled by the centering servo during rough seek mode (the laser beam is locked to the optical center of the lens).

FIG. 4 schematically illustrates a plot of the center error (CE) when the lens is controlled by the tracking servo under tracking mode (the laser beam is locked to the track), and when the lens is controlled by the centering servo during rough seek mode (the laser beam is locked to the optical center of the lens). During track lock (tracking mode), the CE shows sinusoidal motion as the lens moves to follow the run out such that the laser beam follows the center of the track. The CE also shows a slight ramp, as the lens moves slowly toward the outer diameter to follow the spiral of the track. On the other hand, during the rough seek, both of these effects disappear. Instead of following the track, the control system tries to keep the lens at the center of the housing (i.e., the optical center) where CE=0. As shown in FIG. 4, after the seek, the control system tries to lock the laser beam spot to the track again. Depending on the amount of relative motion between the laser beam spot and a target track, however, the re-locking to the track can take long time, or may fail outright.

Figure 5:
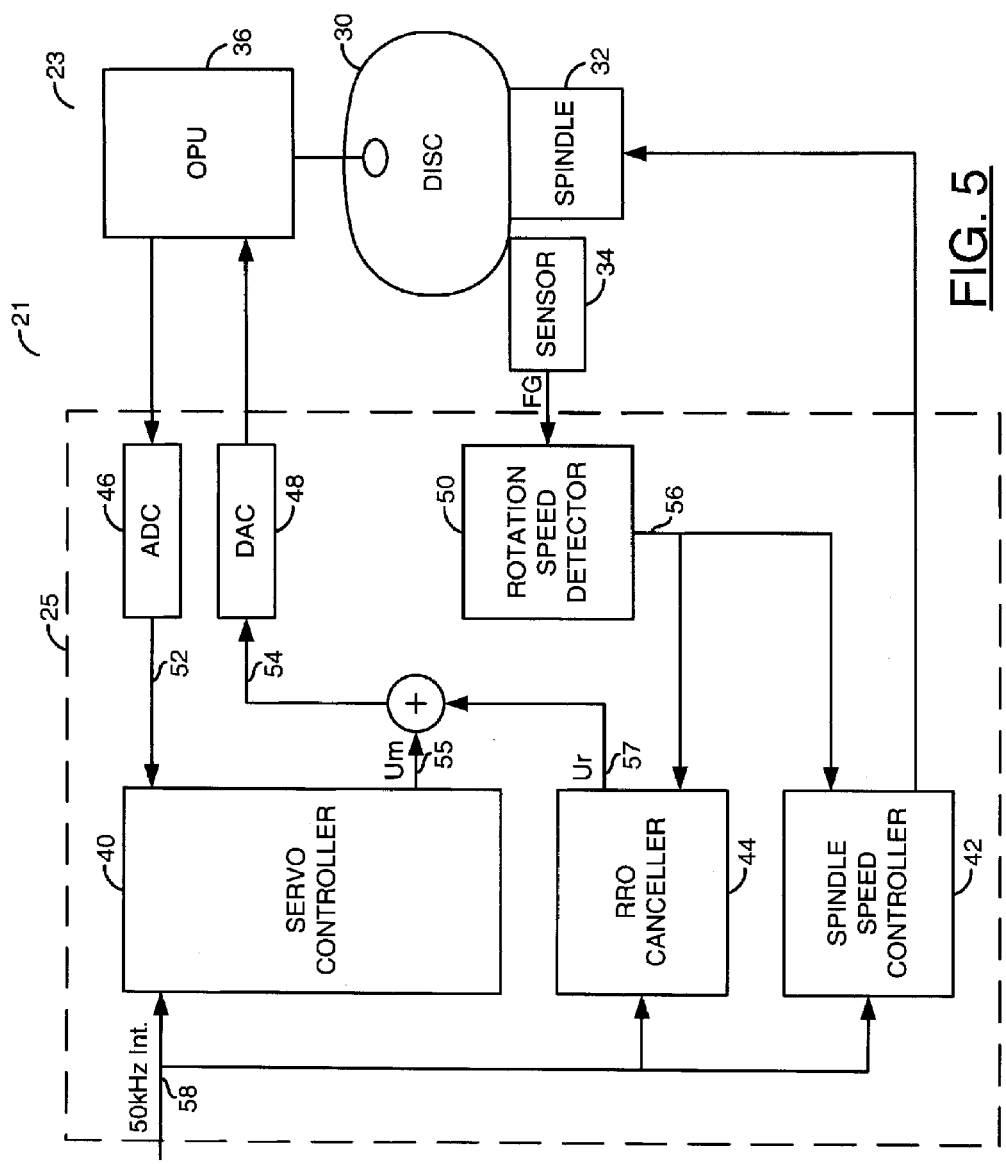
FIG. 5 is a block diagram schematically illustrating an example of an optical driver suitable to implement embodiments of the present invention.

FIG. 5 schematically illustrates an example of the optical driver 21 suitable to implement embodiments of the present invention. FIG. 5 illustrates the optical driver 21 when it is operating in the tracking (tracking servo) operation mode. The optical driver 21 includes a plant part 23 and a controller part 25. The plant part 23, which is physical mechanisms for driving an optical recording medium (optical disc) 30, includes a spindle motor 32, a sensor (for example, a set of Hall sensors) 34, and an optical pickup unit (OPU) 36 such as a read-write head. Other physical mechanisms of the optical driver 21 are not shown in FIG. 5 for simplicity, but are well understood by one of ordinary skill in the art. The optical recording medium 30 may be a compact disc (CD), a digital versatile disc (DVD), or the like.

The controller part 25 is typically implemented as a computer program on a digital signal processor (DSP), but can be any combination of software and hardware. The software may be stored on a program storage device readable by a machine; The controller part 25 includes a servo controller 40, a spindle speed controller 42, and an RRO canceller 44. The controller part 25 may further include an analog-digital converter (ADC) 46, a digital-analog converter 48, and a spindle rotation speed detector 50. A feedback signal 52 from the OPU 36 is supplied to the servo controller 40 through the ADC 46, and a control signal 54 is applied to the OPU 36 through the DAC 48. During a closed loop track following or fine seek operation where the laser beam spot is locked to the track of the recording medium 30, the control signal 54 includes both the closed loop control 55 (output $u_m(s)$ of the servo controller 40) and a feed-forward RRO cancellation control 57 (output u$_r$(s) of the RRO canceller 44).

Typically, the rotation speed detector 50 receives a pulse signal such as an FG signal from the sensor 34, and supplies a speed signal 56 to the RRO canceller 44 and the spindle speed controller 42. The servo controller 40 controls tracking and positioning of the OPU 36. The spindle speed controller 42 is coupled to the rotation speed detector 50 and the spindle motor 32 of the disc driver, and controls the rotation speed of the spindle motor 32, for example, to achieve a constant linear velocity. The controller part 25 may operate in accordance with a clock signal 58, for example, of 50 kHz. However, the configuration of the spindle control part of the optical driver 21 is merely illustrative, and the present invention is not limited to a specific configuration of the spindle control portion.

Figure 6:
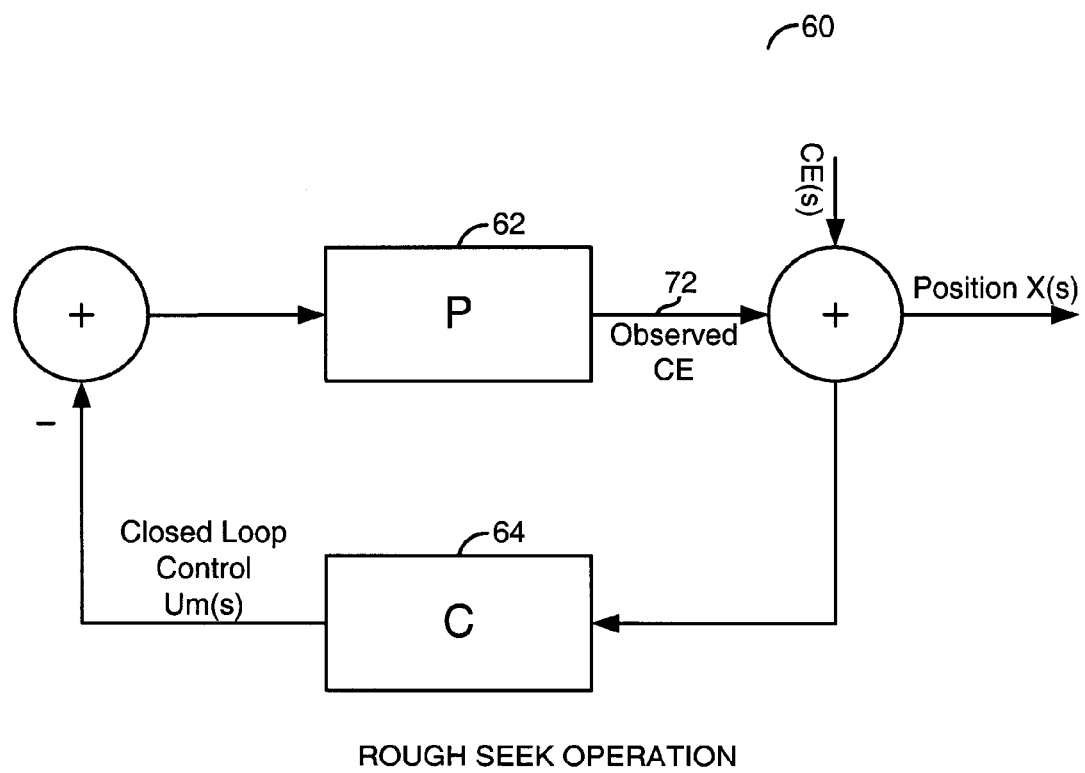
FIG. 6 is a diagram schematically illustrating an optical driver performing a rough seek operation in accordance with one embodiment of the present invention.

In accordance with one embodiment of the present invention, in order to reduce the relative motion of the laser beam spot and the disc during a rough seek operation, an open loop signal is injected into the closed loop during the rough seek. FIG. 6 schematically illustrates an optical driver 60 during the rough seek operation in accordance with one embodiment of the present invention. The optical driver 60 includes a plant 62 and a controller 64. In this embodiment, the center error is observed ("first center error" 26) when the beam spot is locked to the disc, for example, during a closed loop operation, as shown in FIG. 5. The observed first center error 26 is then applied as a center error (CE) signal 66 to the center error ("second center error" 72) observed during a rough seek operation when the spot is not locked to the disc, as shown in FIG. 6. This added CE signal 66 will induce a motion in the lens relative to the center of the housing of the OPU, which reflect the motion of the disc, thereby reducing the relative motion between the beam spot and the disc (or the track thereon).

Figure 7:
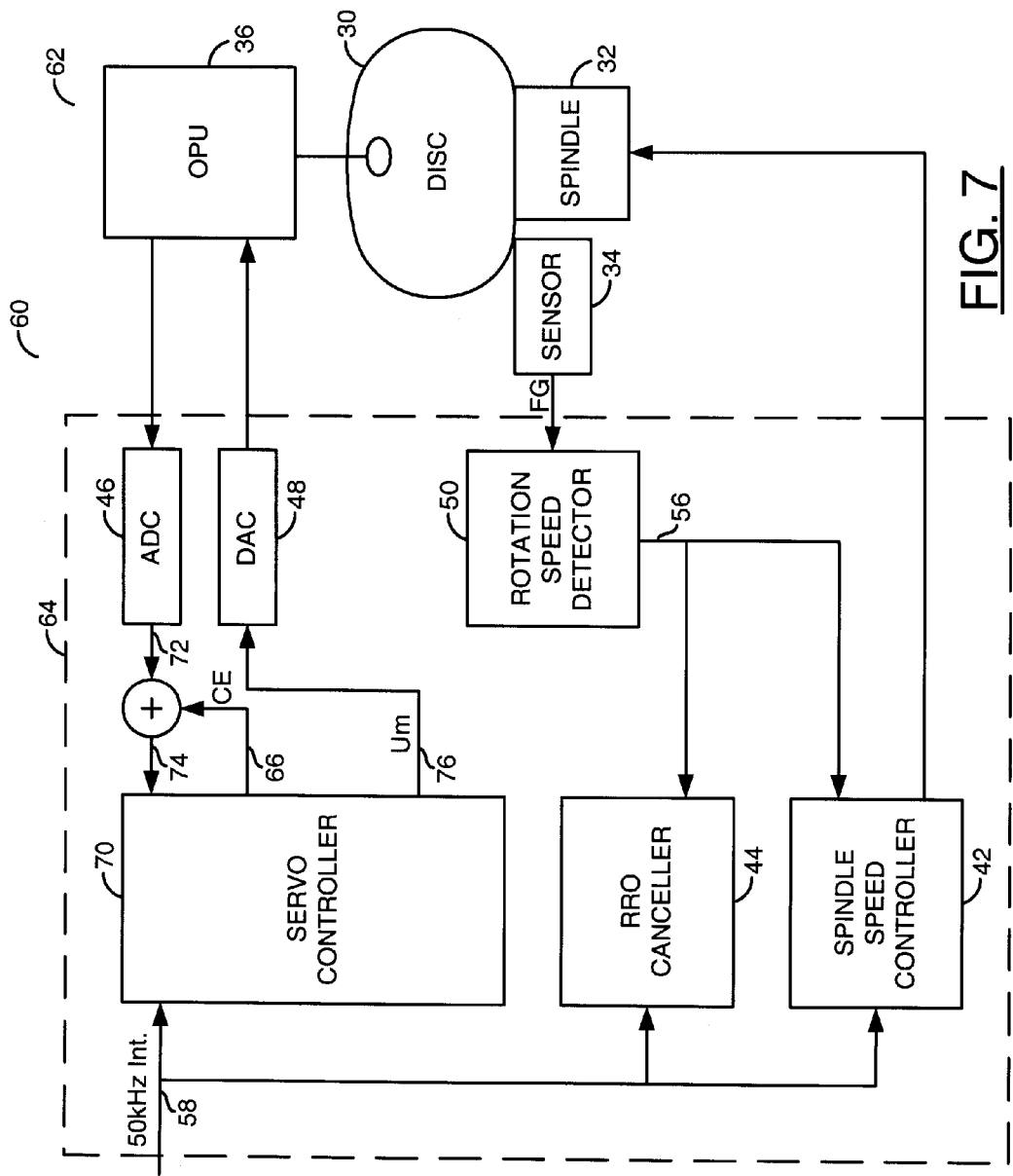
FIG. 7 is a block diagram schematically illustrating an example of the optical driver when it is performing a rough seek operation, in accordance with one embodiment of the present invention.

FIG. 7 schematically illustrates an example of the optical driver 60 when it is performing a rough seek operation. As mentioned above, the optical driver 60 includes the plant part 62 and a controller part 64. In the plant part 62, the like elements are denoted by the like numeral references as those in FIG. 5. The controller part 64 is typically implemented as a computer program on a digital signal processor (DSP), but can be any combination of software and hardware. The software may be stored on a program storage device readable by a machine. The controller part 64 includes a servo controller 70, a spindle speed controller 42, and an RRO canceller 44. The controller part 64 may further include an analog-digital converter (ADC) 46, a digital-analog converter 48, and a spindle rotation speed detector 50. The like elements are denoted by the like numeral references as those in FIG. 5. It should be noted that RRO canceller 44 is not used during the rough seek operation in accordance with one embodiment of the present invention. A feedback signal (observed center error signal) 72 is supplied from the OPU 36 through the ADC 46, and a CE signal 66 is added to the observed center error signal 72. Thus, the servo controller 70 sees (receives) the added signal 74. The servo controller 70 performs a closed loop control based on the added signal 74, and outputs a control signal 76. The control signal 76 is applied to the OPU 36 through the DAC 48.

Figure 8:
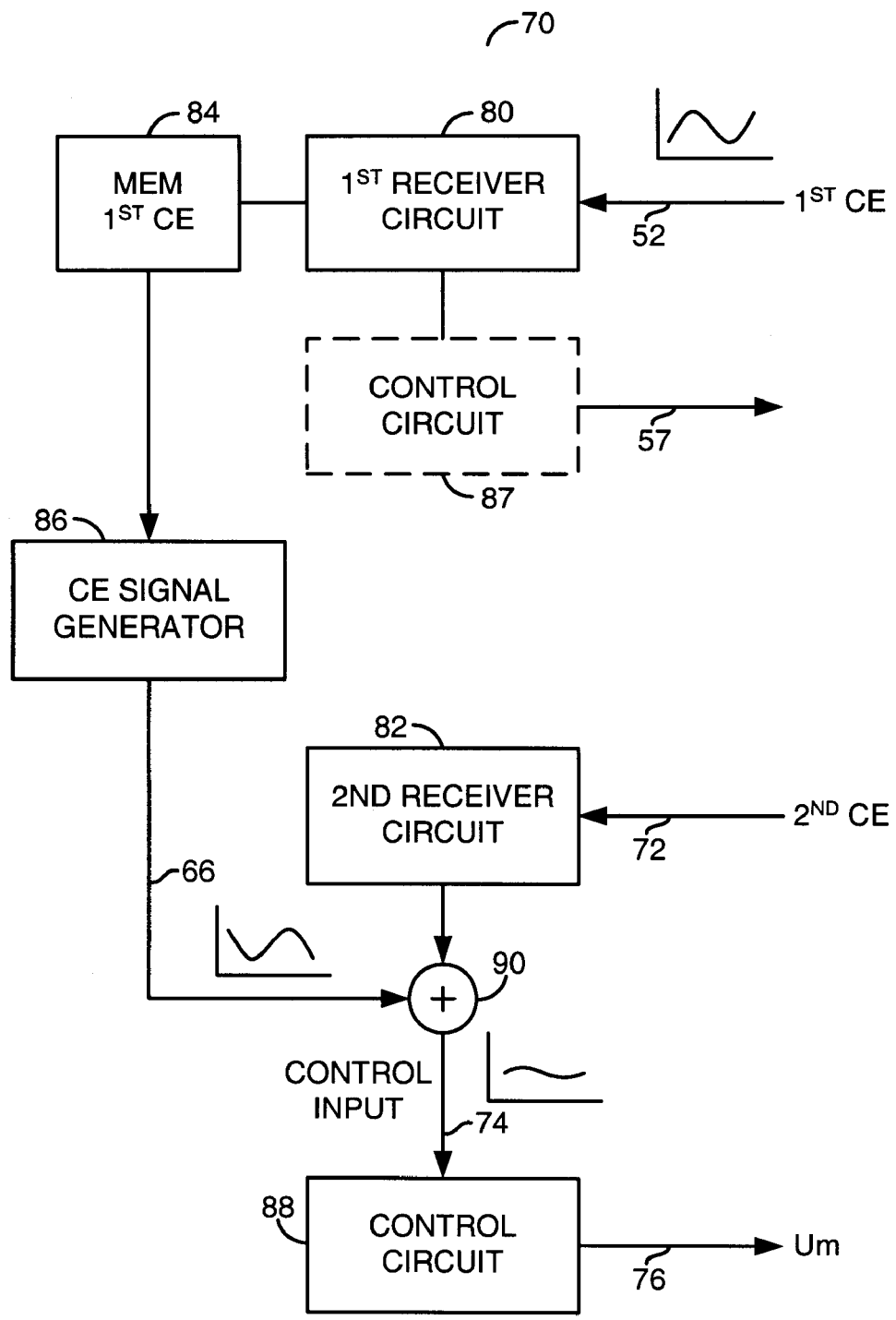
FIG. 8 is a block diagram schematically illustrating an example of the servo controller in accordance with one embodiment of the present invention.

FIG. 8 schematically illustrates an example of the servo controller 70 in accordance with one embodiment of the present invention. The servo controller 70 includes a first receiver circuit 80, a second receiver circuit 82, a memory 84 coupled with the first receiver circuit 80, a center error (CE) signal generator 86, and a control circuit 88, as shown in FIG. 8. The first receiver circuit 80 is adapted to observe a first center error 52 during a first closed loop control where the beam spot is locked to a track of the recording medium, in a similar manner as that shown in FIG. 5. The first center error 52 includes a repeatable run out (RRO) error, and the information of the first center error is store in the memory 84. During the tracking closed loop operations, a control circuit 87 may perform a closed loop control based on the observed first center error in a similar manner as that in the servo controller 40. The control circuit 87 does not operate during the rough seek. It should be noted that although the memory 84 is illustrated as a separate element, it may be integrated with the first receiver circuit 80. In addition, one or more of these circuits may be integrated into one circuit.

The second receiver circuit 82 is adapted to observe a second center error 72 in a second closed loop control during a rough seek operation in which the beam spot is unlocked from the disc (rough seek). During the rough seek operation, the CE signal generator 86 generates a CE signal 66 based on the information of the first center error stored in the memory 84, and the CE signal 66 is added to the observed second center error 72 via an adder 90. The adder 90 may be implemented within the second receiver circuit 82 or the CE signal generator 86. The control circuit 88 controls the beam spot based on an input signal 74 which includes the second center error 72 and the added center error signal 66. As shown in FIG. 8, the CE signal 66 is generated so as to mostly cancel the observed center error 72. Because the cancellation is not perfect, the control input signal 74 has a small amount of residual center error. The control circuit 88 generates a closed loop control signal 76 based on this residual center error. The center error signal 66 added to the control input signal 74 induces a motion of the lens relative to an optical center of the OPU during the rough seek operation. Thus, when the rough seek is completed, the relative motion between the beam spot and the disc is also reduced, which improves the ability of the beam spot to lock to the disc after the rough seek.

Figure 9:
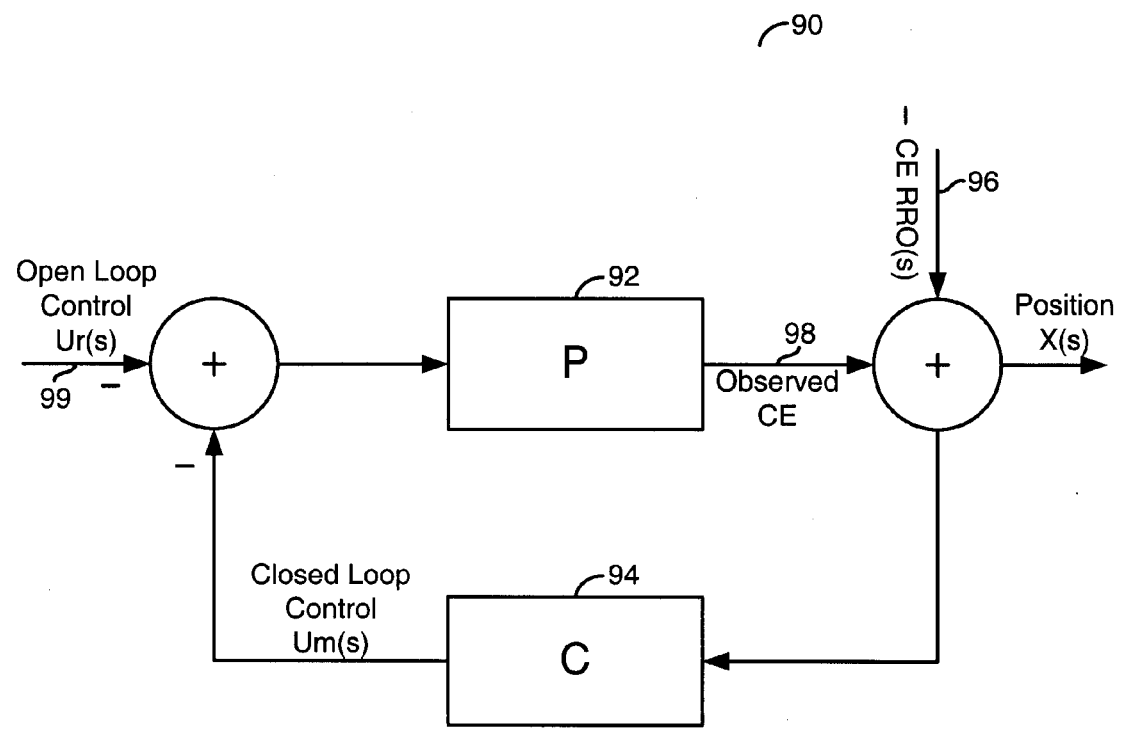
FIG. 9 is a block diagram schematically illustrating an optical driver during the rough seek operation in accordance with one embodiment of the present invention.

In accordance with one embodiment of the present invention, in order to reduce the relative motion of the laser beam spot and the disc, open loop signals are injected into the closed loop during the rough seek operation. FIG. 9 schematically illustrates an optical driver 90 during the rough seek (sled seek) operation in accordance with one embodiment of the present invention. The optical driver 90 includes a plant 92 and a controller 94. In this embodiment, an open loop control 99 (Ur(s)) is added to the closed loop control ("second closed loop") during the rough seek operation, which induces a motion of the lens relative to the optical center of the OPU during the rough seek. If a feed-forward repeatable run out (RRO) cancellation control has been performed for a tracking closed loop operation where the beam spot is locked to a track of the recording medium, for example, by the RRO canceller 44 as shown in FIG. 5, this information can be used for the open loop control 99. If not, the same RRO cancellation method can be used to determine the open loop control 99.

In addition, similar to the optical driver 60, the center error ("first center error" 26) is observed during the tracking closed loop operation, as shown in FIG. 5. Based on the observed first center error 26, a center error-RRO is estimated, and then a corresponding center error (CE)-RRO signal 96 is subtracted from the center error ("second center error" 98) observed during the rough seek operation. The CE-RRO signal 96 may be generated using a sinusoid wave at an RRO frequency, or alternatively, using a look-up table. By subtracting the CE-RRO signal 96 from the observed center error 98, the rough seek controller 94 (in FIG. 9) does not see the induced center error and thus does not cancel the induced relative motion in the closed loop control. The induced motion in the lens relative to the center of the housing of the OPU, which reflect the motion of the disc, reduces the relative motion between the beam spot and the disc (or the track thereon) when the rough seek is completed.

Figure 10:
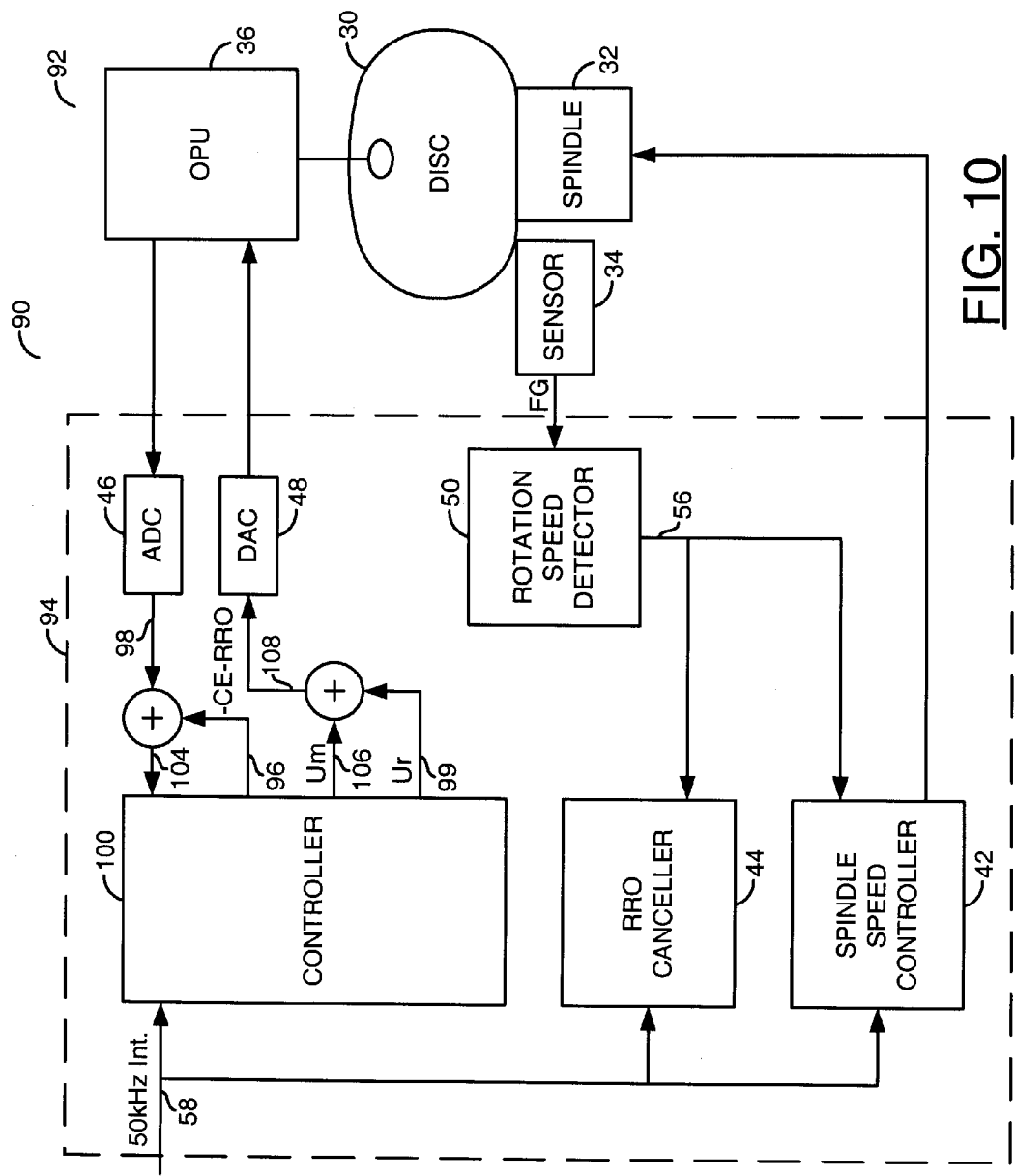
FIG. 10 is a block diagram schematically illustrating an example of the optical driver when it is performing a rough seek operation in accordance with one embodiment of the present invention.

FIG. 10 schematically illustrates an example of the optical driver 90 when it is performing in a rough seek operation. As mentioned above, the optical driver 90 includes the plant part 92 and a controller part 94. In the plant part 92, the like elements are denoted by the like numeral references as those in FIG. 5. The controller part 94 is typically implemented as a computer program on a digital signal processor (DSP), but can be any combination of software and hardware. The software may be stored on a program storage device readable by a machine. The controller part 94 includes a controller 100, a spindle speed controller 42, and an RRO canceller 44. The controller part 94 may further include an analog-digital converter (ADC) 46, a digital-analog converter 48, and a spindle rotation speed detector 50. The like elements are denoted by the like numeral references as those in FIG. 5. It should be noted that RRO canceller 44 is not used during the rough seek operation in accordance with one embodiment of the present invention.

During the rough seek operation, the controller 100 generates the open loop control 99 based on the information of the RRO cancellation for the tracking closed loop operation where the laser beam is locked to the disc. A feedback signal (observed center error signal) 98 is supplied from the OPU 36 through the ADC 46, and the CE-RRO signal 96 is subtracted from the observed center error signal 98. Thus, the controller 100 sees (receives) the subtracted signal 104. The controller 100 also performs a closed loop control based on the subtracted signal 104, and outputs a closed loop control signal 106, to which the open-loop control 99 is added. The combined control signal 108 is applied to the OPU 36 through the DAC 48.

Figure 11:
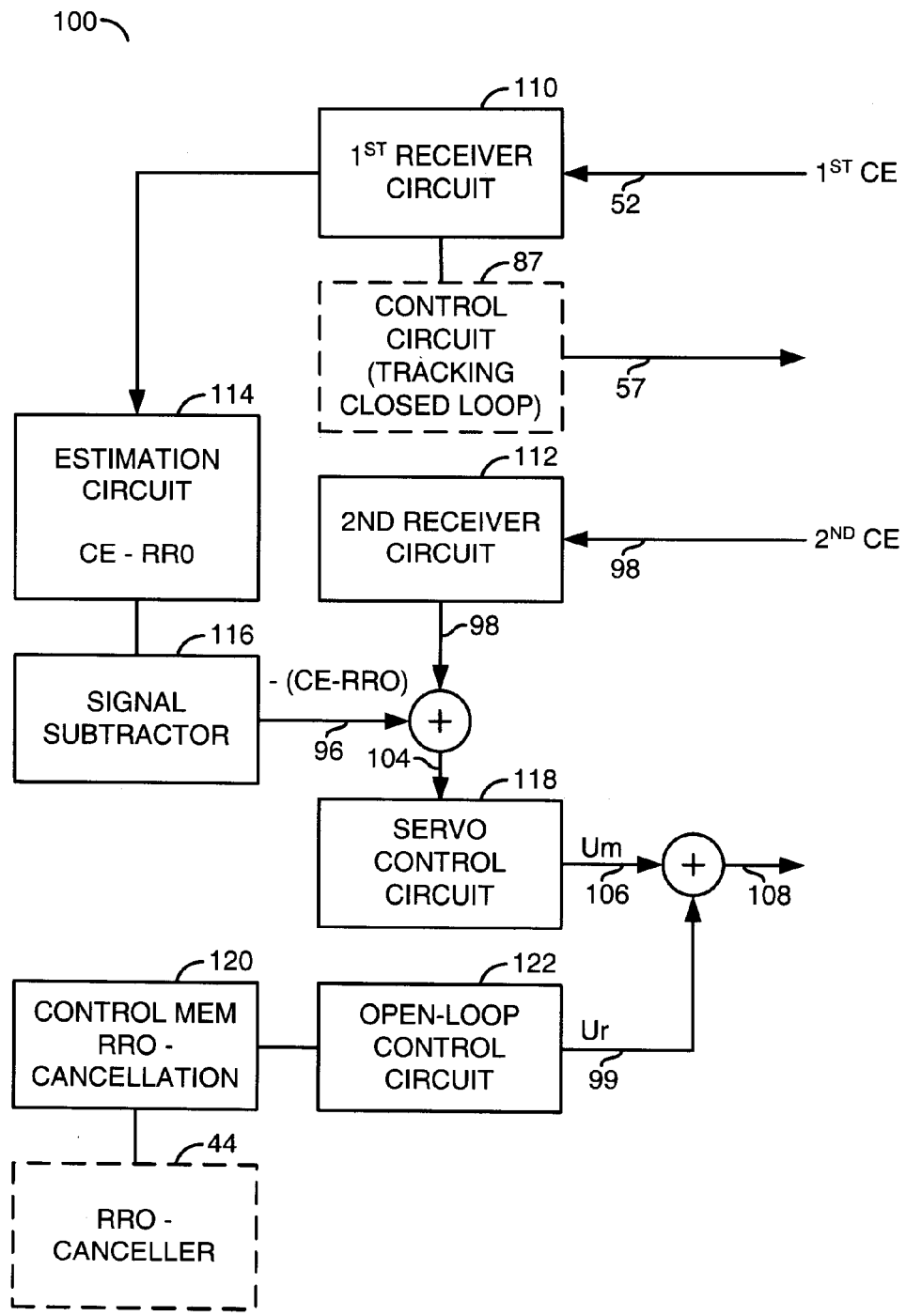
FIG. 11 is a block diagram schematically illustrating an example of the controller of an optical driver in accordance with one embodiment of the present invention.

FIG. 11 schematically illustrates an example of the controller 100 in accordance with one embodiment of the present invention. The controller 100 includes a first receiver circuit 110, a second receiver circuit 112, an estimation circuit 114, a signal subtracter 116, a servo control circuit 118, a control memory 120, and an open-loop control circuit 122. The first receiver circuit 110 is adapted to observe a first center error in a first closed loop control where the beam spot is locked to the track of the recording medium. The first center error includes a repeatable run out (RRO) error. During tracking closed loop operations, a control circuit 87 may perform a closed loop control based on the observed first center error in a similar manner as that in the servo controller 40. The control circuit 87 does not operate during the rough seek. The estimation circuit 114 is adapted to estimate a center error-RRO from the observed first center error, and to store information of the center error-RRO. The center error-RRO is part of the first center error which is caused by the RRO. The center error-RRO estimation may be generated using a sinusoid wave at an RRO frequency, or alternatively, using a look-up table.

During a rough seek operation, the second receiver circuit 112 observes a second center error in a second closed loop control where the beam spot is unlocked from the disc. The signal subtracter 116 is coupled to the estimation circuit 114, and subtracts the center error-RRO 96 from the observed second center error 98 during the rough seek operation. The servo control circuit 118 controls the beam spot based on an input control signal 104 which is the second center error 98 less the center error-RRO 96 during the rough seek operation. The servo control circuit 118 outputs a closed loop control signal 106.

The control memory 120 stores information of an open loop control associated with a feed-forward repeatable run out (RRO) cancellation control for a closed loop control where the beam spot is locked to a track of the recording medium. The control memory may receive such information from the RRO canceller 44 which performed such a feed-forward RRO cancellation. The open loop control circuit 122 is coupled with the control memory 120, and adapted to generate the open loop control 99 based on the RRO-cancellation information during the rough seek operation. The open loop control circuit 122 adds the open loop control 99 to the closed loop control 106, and the added open loop control 99 induces a motion of the lens relative to an optical center of the OPU during the rough seek operation. Thus, when the rough seek is completed, the relative motion between the beam spot and the disc is also reduced, which improves the ability of the beam spot to lock to the disc after the rough seek.

As described above, the open loop control 99 is designed to cause the lens to move as if it were following the track, so as to reduce the relative motion between the beam spot and the disc motion. The open loop control 99 may be used to suppress the run out during the fine seek with track lock. The open loop control 99 induces a center error which is substantially equal to that seen during the tracking closed loop operation. To ensure that the controller does not counteract the induced center error, the CE RRO 96 is subtracted before input to the servo control circuit 118. Since the servo control circuit 118 does not see the induced run out, it generates no counteracting closed loop control. Thus, the control is more precise than that in the optical driver 60 described above. In the optical driver 60, the control circuit only partially counteracts the resulting center error. Depending on required precision, either embodiment can be used for a specific application.

Figure 12:
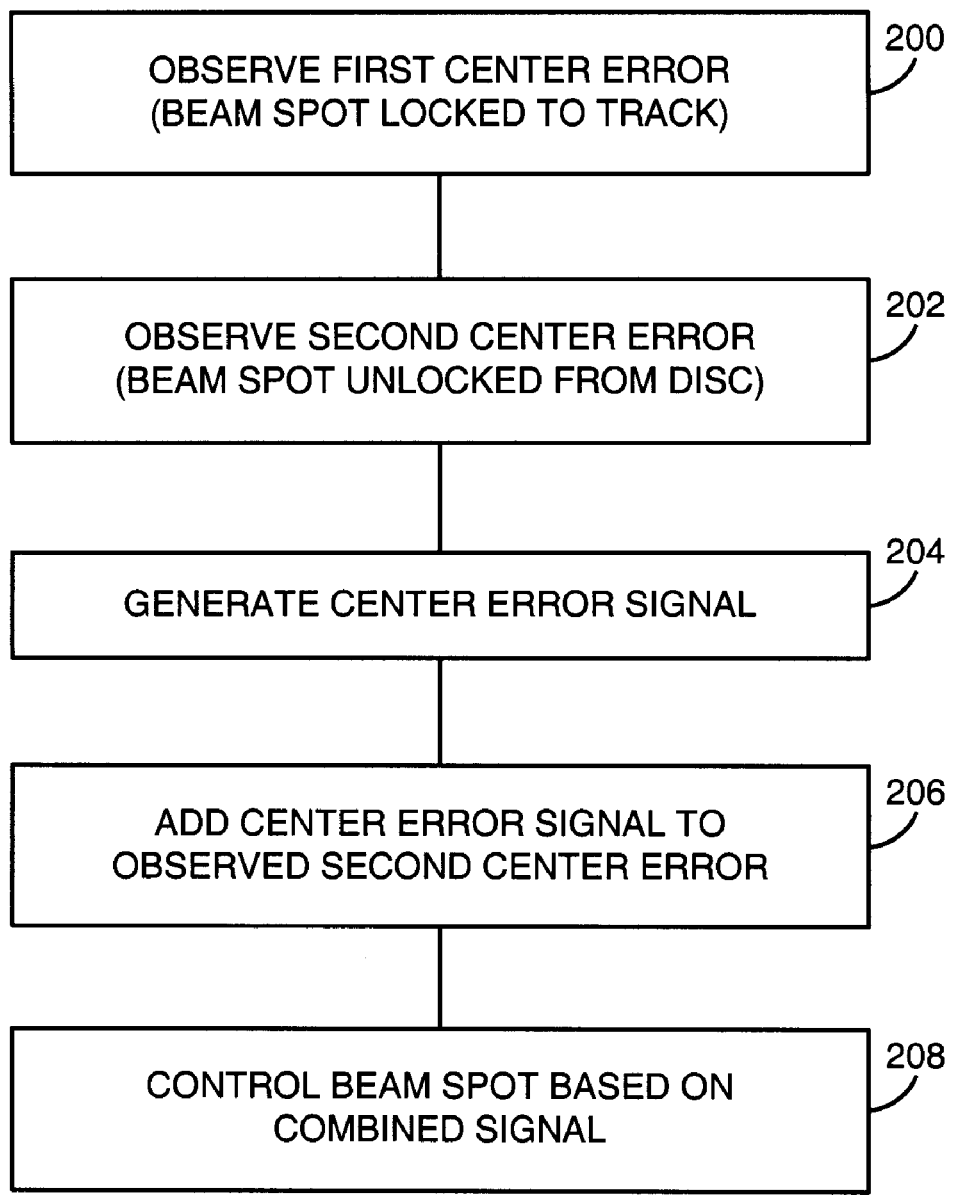
FIG. 12 is a process flow diagram schematically illustrating a method for positioning a beam spot on a recording medium via a lens housed in an optical pickup unit (OPU) in accordance with one embodiment of the present invention.

FIG. 12 schematically illustrates a method for positioning a beam spot on a recording medium via a lens housed in an optical pickup unit (OPU) in accordance with one embodiment of the present invention. During a first closed loop control where the beam spot is locked to a track of the recording medium, a first center error is observed (200). The first center error includes a repeatable run out (RRO) error. The information of the first center error may be stored in a memory. During a second closed loop control in which a rough seek operation is performed with the beam spot unlocked from the disc, a second center error is observed (202). Based on the first center error information, a center error signal is generated during the rough seek operation (204), and the center error signal is added to the observed second center error (206). The center error signal is determined such that the center error signal substantially cancels the first center error if the center error signal is added to the observed first center error. The beam spot is controlled based on the second center error combined with the center error signal (208), where the added center error signal induces a motion of the lens relative to an optical center of the OPU during the rough seek operation. The induced motion reduces a relative motion between the disc and the lens during the rough seek operation.

Figure 13:
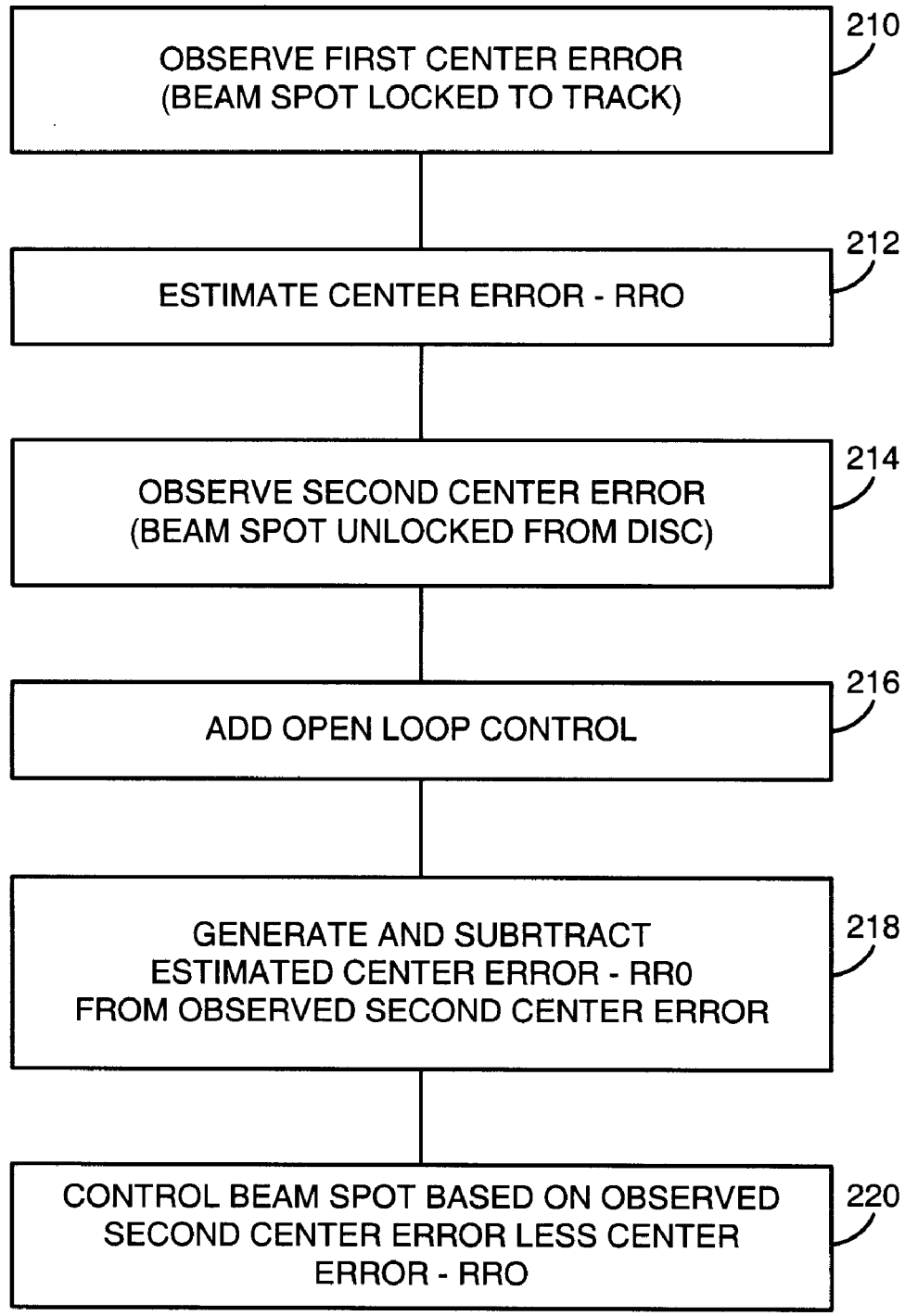
FIG. 13 is a process flow diagram schematically illustrating a method for positioning a beam spot on a recording medium via a lens housed in an optical pickup unit (OPU) in accordance with another embodiment of the present invention.

FIG. 13 schematically illustrates a method for positioning a beam spot on a recording medium via a lens housed in an optical pickup unit (OPU), in accordance with another embodiment of the present invention. First, similarly to the above embodiment, a first center error is observed in a first closed loop control where the beam spot is locked to a track of the recording medium (210). The first center error including a repeatable run out (RRO) error. A center error-RRO is estimated from the observed first center error (212). The center error-RRO is part of the first center error caused by the RRO. A center error-RRO signal may be generated using a sinusoid wave at an RRO frequency, or alternatively, using a look-up table, during the rough seek operation. A second center error in a second closed loop control is observed during a rough seek operation in which the beam spot is unlocked from the disc (214). During the rough seek operation, an open loop control is also added to the second closed loop control (216), such that the added open loop control induces a motion of the lens relative to an optical center of the OPU during the rough seek operation. The estimated center error-RRO is subtracted from the observed second center error (218), and the beam spot is controlled based on the second center error less the center error-RRO during the rough seek operation (220). The motion of the lens induced by the open loop control reduces a relative motion between the disc and the lens by during the rough seek operation. The open loop control may be determined based on information of a feed-forward repeatable run out (RRO) cancellation control for the first closed loop control where the beam spot is locked to a track of the recording medium. Such information may be readily available, or may be obtained by performing such a RRO cancellation control.

Figure 14:
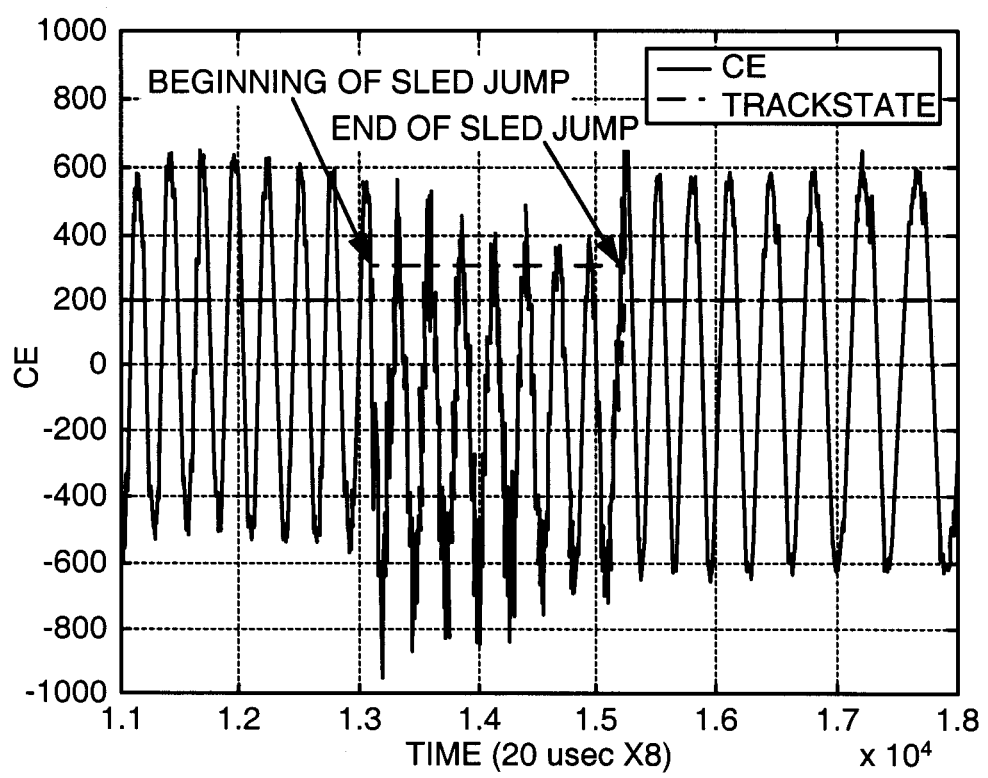
FIG. 14 is a diagram schematically illustrating the effect of adding an open loop control during rough seek operation in accordance with one embodiment of the present invention.

FIG. 14 schematically illustrates the effect of adding an open loop control during rough seek operation in accordance with one embodiment of the present invention. Compared with FIG. 4, the center error (CE) is no longer kept centering at zero during the sled motion. Instead, the lens continues to follow disc run out throughout the sled motion such that the relative motion between the lens and the disc due to run out effect is minimized.

Figure 15:
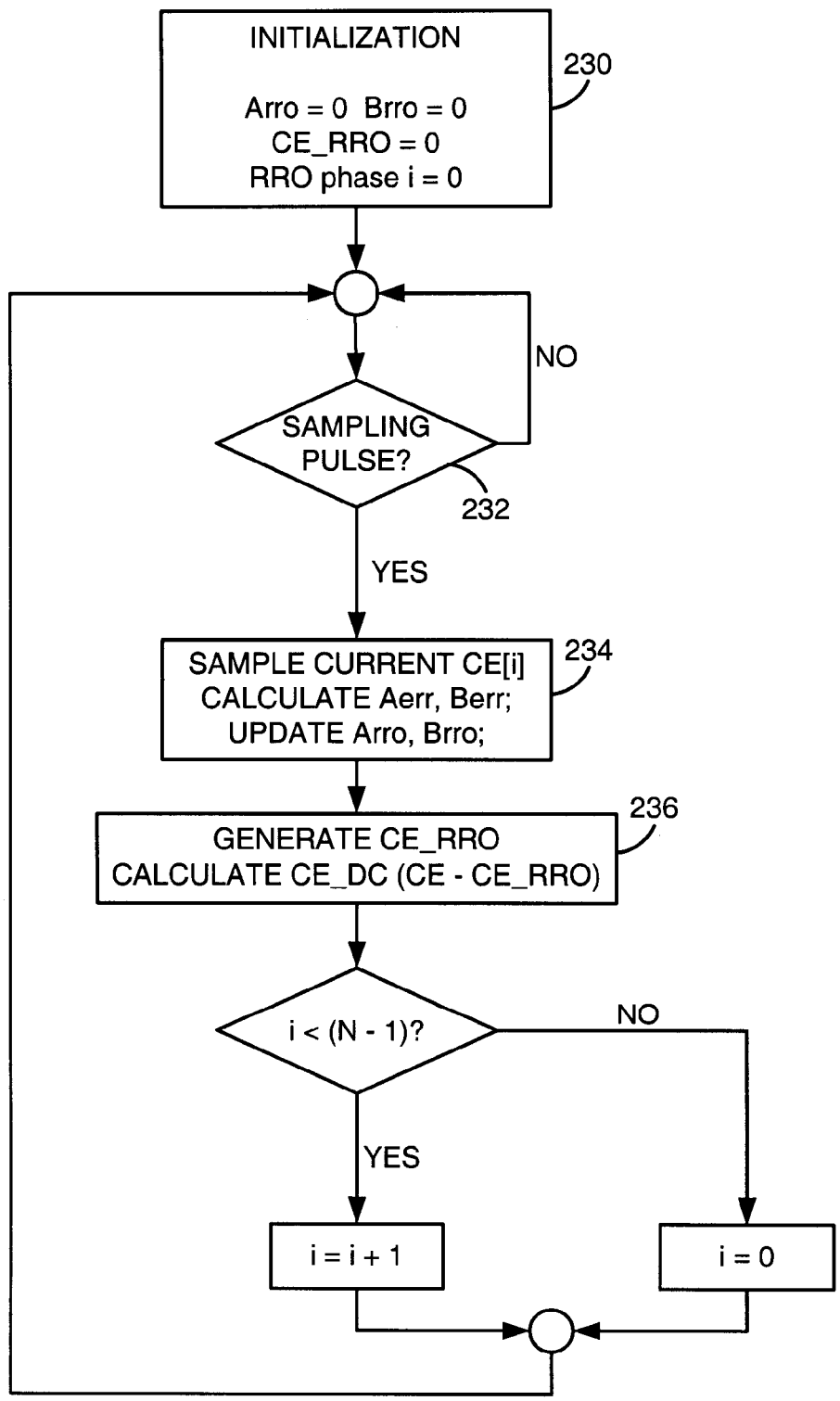
FIG. 15 is a process flow diagram schematically illustrating an example of a method for generating the CE-RRO in accordance with one embodiment of the present invention.

FIG. 15 schematically illustrates an example of a method for generating the CE-RRO in accordance with one embodiment of the present invention. During the tracking closed loop operations where the control follows the track, the RRO can be observed on the CE. It consists of a sinusoid with the same frequency as the disc rotation. This method adapts the coefficients of a sine and cosine wave so that the resulting sinusoid (referred to as "CE-RRO") equals the RRO. The RRO adaptation starts with the sinusoid at zero magnitude (initialization) (230). The CE is sampled in accordance with a sampling pulse (232). For each CE sample, the CE-RRO is updated using new measurements (234). The effect of the new CE-RRO is observed by measuring the difference between the sinusoid: CE-RRO and the center error: CE (236), and the CE-RRO is again updated.

More specifically, CE-RRO coefficients $A_{rro}$ and $B_{rro}$ are set to zero, and the sine wave and cosine wave generators are initialized at the RRO frequency. The difference between the measured RRO and CE-RRO is calculated as follows:
 a. Initialize the two sum variables, $A_{err}$ and $B_{err}$ to zero.
 b. At each measurement time, multiply the measurement by the corresponding sine wave value, and accumulate to $A_{err}$.
 c. At each measurement time, multiply the measurement by the corresponding cosine wave value, and accumulate to $B_{err}$.

After the measurement is done, $A_{err}$ and $B_{err}$ are multiplied by 2/N, where N is the number of measurements, $A_{rro}$ is updated to $A_{rro}+\mu A_{err}$, where $\mu$ is the update coefficient, a design parameter, and $B_{rro}$ is updated to $B_{rro}+\mu B_{err}$. The new CE-RRO output CE-RRO=$A_{rro} \sin(\omega_0 t)+B_{rro} \cos(\omega_0 t)$ is then generated. Form the new difference with the RRO measurement, RRO phase index is updated and the process is repeated from initializing the sine wave and cosine wave generators.

The CE-RRO itself is a sine wave, and it is generated by using the weighted sum of a sine and cosine at the appropriate frequency. These weights are the CE-RRO coefficients $A_{rro}$ and $B_{rro}$. They are initialized only once in the algorithm. Sine and cosine wave generation methods are well known in the state of the art. The generators are reinitialized each cycle, and produce both a sine and cosine wave at the RRO frequency.

The design parameter $\mu$ controls the update speed. The larger the value of $\mu$, the faster the cancellation control adapts to changing run out, but the more noise affects it. If the update is too large, then the adaptation can actually diverge. On the other hand, if $\mu$ is too small, then the CE-RRO may converge too slowly. Mathematical analysis and experiment can guide the selection of $\mu$.

FIG. 16 schematically illustrates an effect of adding an open loop control based on the CE-RRO in the lens control during sled motion of a rough seek. The induced center error shortens the time for acquiring track lock at the end, since the relative speed between the lens and the tracks on the disc is greatly reduced. The effect is especially significant on high run out discs. FIG. 16 shows the laboratory result taken as a comparison of rough seek times for different seek lengths between lens control with and without CE-RRO injection during sled jump for rough seeks.

While embodiments and applications of this invention have been shown and described, it would be apparent to those skilled in the art having the benefit of this disclosure that many more modifications than mentioned above are possible without departing from the inventive concepts herein. The invention, therefore, is not to be restricted except in the spirit of the appended claims.

What is claimed is:

1. A method for positioning a beam spot on a recording medium of a disc via a lens housed in an optical pickup unit (OPU), said method comprising:
 observing a first center error in a first closed loop control where the beam spot is locked to a track of the recording medium, the first center error including a repeatable run out (RRO) error;
 observing a second center error in a second closed loop control during a rough seek operation in which the beam spot is unlocked from the disc;
 generating a center error signal based on the first center error;
 adding the center error signal to the observed second center error during the rough seek operation; and
 controlling the beam spot based on the second center error combined with the center error signal, the center error signal inducing a motion of the lens relative to an optical center of the OPU during the rough seek operation.

2. The method of claim 1, further comprising:
 reducing a relative motion between the disc and the lens by the induced motion of the lens during the rough seek operation.

3. The method of claim 1, wherein the center error signal is determined such that the center error signal cancels the first center error if the center error signal is added to the observed first center error.

4. A method for positioning a beam spot on a recording medium of a disc via a lens housed in an optical pickup unit (OPU), said method comprising:
 observing a first center error in a first closed loop control where the beam spot is locked to a track of the recording medium, the first center error including a repeatable run out (RRO) error;
 estimating a center error-RRO from the observed first center error, the center error-RRO being part of the first center error caused by the RRO;

observing a second center error in a second closed loop control during a rough seek operation in which the beam spot is unlocked from the disc;

subtracting the center error-PRO from the observed second center error; controlling the beam spot based on the second center error less the center error-RRO during the rough seek operation; and adding an open loop control to the second closed loop control during the rough seek operation, the added open loop control inducing a motion of the lens relative to an optical center of the OPU during the rough seek operation.

5. The method of claim 4, further comprising:

determining and storing information of the open loop control based on a feed-forward repeatable run out cancellation control in the first closed loop control where the beam spot is locked to a track of the recording medium.

6. The method of claim 4, further comprising:

reducing a relative motion between the disc and the lens by the induced motion of the lens during the rough seek operation.

7. The method of claim 4, wherein the center error-RRO is generated using a sinusoid wave at an RRO frequency.

8. The method of claim 4, wherein the center error-RRO is generated using a look-up table.

9. An apparatus for positioning a beam spot on a recording medium of a disc via a lens housed in an optical pickup unit (OPU), said apparatus comprising:

means for observing a first center error in a first closed loop control where the beam spot is locked to a track of the recording medium, the first center error including a repeatable run out (RRO) error;

means for observing a second center error in a second closed loop control during a rough seek operation in which the beam spot is unlocked from the disc;

means for generating a center error signal based on the first center error;

means for adding the center error signal to the observed second center error during the rough seek operation; and means for controlling the beam spot based on the second center error combined with the center error signal, the center error signal to induce a motion of the lens relative to an optical center of the OPU during the rough seek operation.

10. The apparatus of claim 9, wherein a relative motion between the disc and the lens is reduced by the induced motion of the lens during the rough seek operation.

11. The apparatus of claim 9, wherein the center error signal is determined such that the center error signal cancel the first center error if the center error signal is added to the observed first center error.

12. An apparatus for positioning a beam spot on a recording medium of a disc via a lens housed in an optical pickup unit (OPU), said apparatus comprising:

means for observing a first center error in a first closed loop control where the beam spot is locked to a track of the recording medium, the first center error including a repeatable run out (RRO) error;

means for estimating a center error-RRO from the observed first center error, the center error-RRO being part of the first center error caused by the RRO;

means for observing a second center error in a second closed loop control during a rough seek operation in which the beam spot is unlocked from the disc;

means for subtracting the center error-RRO from the observed second center error;

means for controlling the beam spot based on the second center error less the center error-RRO during the rough seek operation; and means for generating and adding an open loop control to the second closed loop control during the rough seek operation, the added open loop control to induce a motion of the lens relative to an optical center of the OPU during the rough seek operation.

13. The apparatus of claim 12, further comprising:

means for determining and storing information of the open loop control based on a feed-forward repeatable run out cancellation control performed in the first closed loop control where the beam spot is locked to a track of the recording medium.

14. The apparatus of claim 12, wherein a relative motion between the disc and the lens is reduced by the induced motion of the lens during the rough seek operation.

15. The apparatus of claim 12, wherein the center error-RRO is generated using a sinusoid wave at an RRO frequency.

16. The apparatus of claim 12, wherein the center error-RRO is generated using a look-up table.

17. An apparatus f or positioning a beam spot on a recording medium of a disc via a lens housed in an optical pickup unit (OPU), said apparatus comprising:

a first receiver circuit to observe a first center error during a first closed loop control where the beam spot is locked to a track of the recording medium, the first center error including a repeatable run out (RRO) error;

a second receiver circuit to observe a second center error in a second closes loop control during a rough seek operation in which the beam spot is unlocked from the disc;

a memory coupled with the first receiver circuit to store information of the first center error;

a center error signal generator to generate a center error signal based on the information of the first center error;

a signal adder to add the center error signal to the observed second center error during the rough seek operation; and a control circuit to control the beam spot based on the second center error combined with the center error signal, the center error signal to induce a motion of the lens relative to an optical center of the OPU during the rough seek operation.

18. An apparatus for positioning a beam spot on a recording medium of a disc via a lens housed in an optical pickup unit (OPU), said apparatus comprising:

a control memory to store information of an open loop control associated with a feed-forward repeatable run out cancellation control in a first closed loop control where the beam spot is locked to a track of the recording medium;

a first receiver circuit to observe a first center error during the first closed loop control where the beam spot is locked to the track of the recording medium, the first center error including a repeatable run out (RRO) error;

a second receiver circuit to observe a second center error in a second closed loop control during a rough seek operation where the beam spot is unlocked from the disc;

an estimation circuit to estimate a center error-RRO from the observed first center error, and to store information of the center error-RRO, the center error-RRO being part of the first center error caused by the RRO error;

a signal subtracter coupled to said estimation circuit to subtract the center error-RRO from the observed second center error during the rough seek operation;

a servo control circuit to control the beam spot based on the second center error less the center error-RRO during the rough seek operation; and an open loop control circuit coupled with said control memory to generate and add the open loop control to the second closed loop control during the rough seek operation, the added open loop control to induce a motion of the lens relative to an optical center of the OPU during the rough seek operation.

19. A program storage device readable by a machine, tangibly embodying a program of instructions executable by the machine to perform a method for positioning a beam spot on a recording medium of a disc via a lens housed in an optical pickup unit (OPU), said method comprising:

observing a first center error in a first closed loop control where the beam spot is locked to a track of the recording medium, the first center error including a repeatable run out (RRO) error;

observing a second center error in a second closed loop control during a rough seek operation in which the beam spot is unlocked from the disc;

generating a center error signal based on the first center error;

adding the center error signal to the observed second center error during the rough seek operation; and controlling the beam spot based on the second center error combined with the center error signal, the center error signal inducing a motion of the lens relative to an optical center of the OPU during the rough seek operation.

20. A program storage device readable by a machine, tangibly embodying a program of instructions executable by the machine to perform a method for positioning a beam spot on a recording medium of a disc via a lens housed in an optical pickup unit (OPU), said method comprising:

observing a first center error in a first closed loop control where the beam spot is locked to a track of the recording medium, the first center error including a repeatable run out (RRO) error;

estimating a center error-RRO from the observed first center error, the center error-RRO being part of the first center error caused by the RRO error;

observing a second center error in a second closed loop control during a rough seek operation in which the beam spot is unlocked from the disc;

subtracting the center error-RRO from the observed second center error;

controlling the beam spot based on the second center error less the center error-RRO during the rough seek operation; and generating and adding an open loop control to the second closed loop control during the rough seek operation, the added open loop control inducing a motion of the lens relative to an optical center of the OPU during the rough seek operation.

* * * * *